May 14, 1968     TOHCHUNG WEI     3,383,001
HOT CUP
Filed Dec. 19, 1966     3 Sheets-Sheet 1
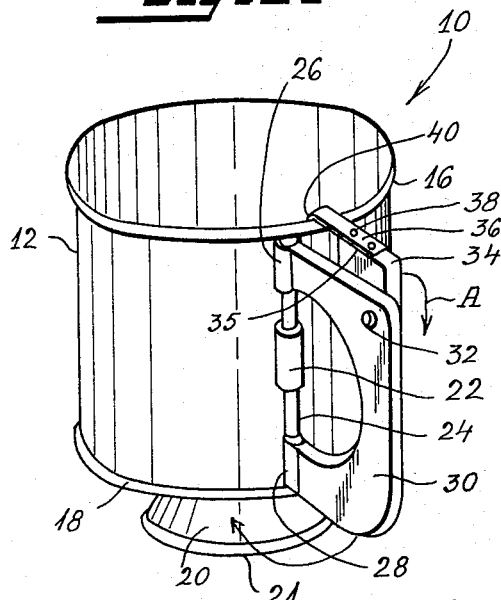
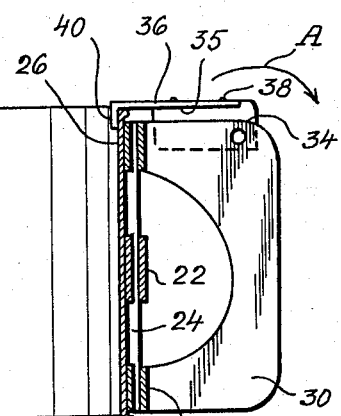
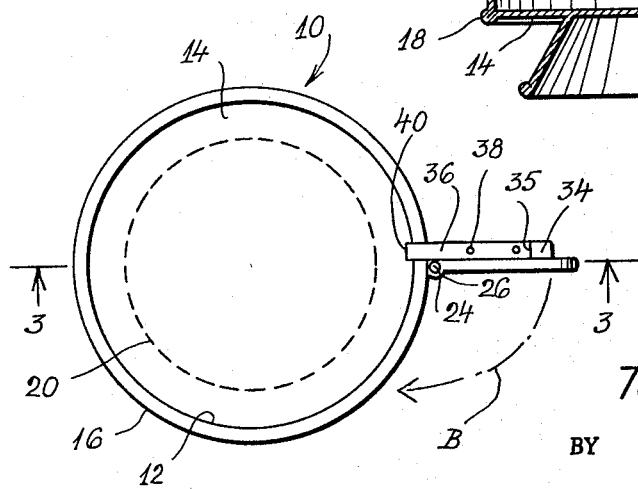
INVENTOR
Tohchung Wei
BY Polachek & Saulsbury
ATTORNEYS May 14, 1968 TOHCHUNG WEI 3,383,001
HOT CUP
Filed Dec. 19, 1966 3 Sheets-Sheet 2

INVENTOR
Tohchung Wei
BY Polachek & Saulsbury
ATTORNEYS

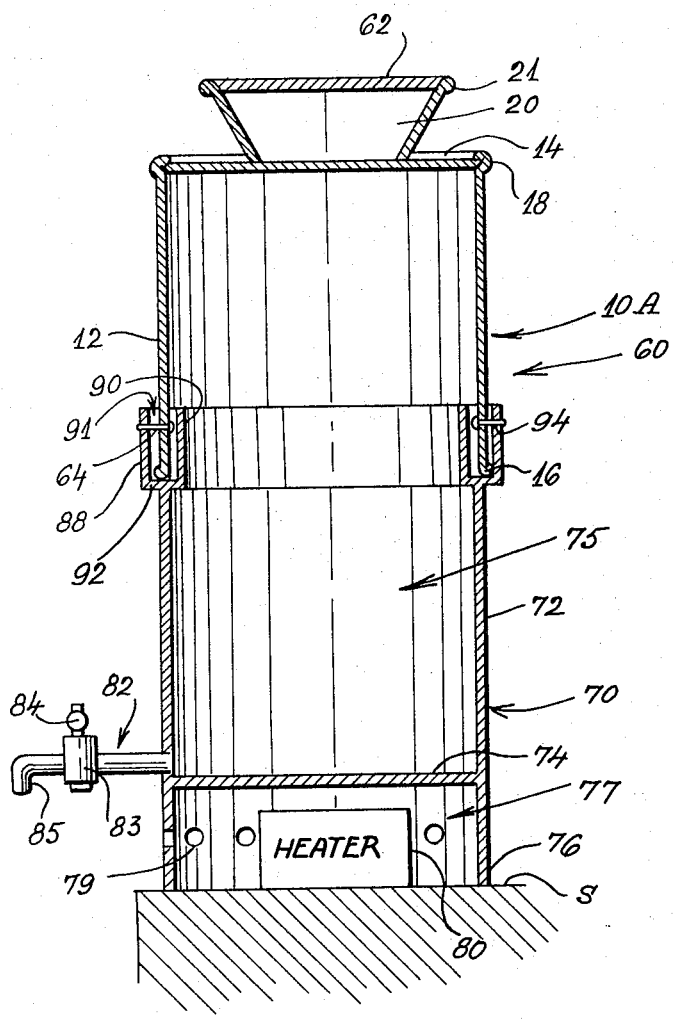
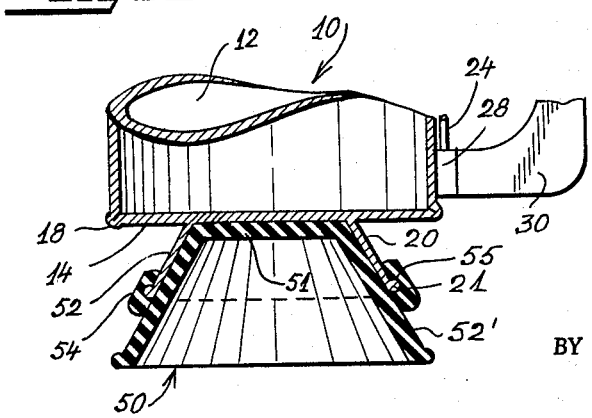

3,383,001
HOT CUP
Tohchung Wei, 169 E. Broadway,
New York, N.Y. 10006
Filed Dec. 19, 1966, Ser. No. 602,617
10 Claims. (Cl. 220—4)

ABSTRACT OF THE DISCLOSURE

The disclosure described a hot cup having a conical foot and hinged handle. The cup can be provided with a suction pad to hold it stationary on a slippery surface. The cup can serve as a cover for a container, as a handle for the container and as a serving utensil for contents of the container.

The invention relates generally to the art of serving utensils and more particularly concerns an improved hot cup with a conical stand and hinged handle.

One object of the invention is to provide a cup with a handle so arranged that the handle can be swung out of the way against the side of the cup when not in use.

Another object is to provide a cup with a conical foot or stand to elevate the cup above a supporting surface.

A further object is to provide a cup of the type described, with a conical suction pad engageable in the conical stand to hold the cup in a set position on slippery surface.

A further object is to provide a container assembly in which the cup serves as a cover for the container and also as a carrying handle for the assembly.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a cup embodying the invention, with hinged handle shown in extended position.

FIG. 2 is a top view of the cup.

FIG. 3 is a vertical sectional view taken on line 3—3 of FIG. 2.

FIG. 5 is a fragmentary sectional view similar to a part of FIG. 4, showing the cup assembled with a suction cup.

FIG. 8 is a vertical sectional view taken on line 8—8 of FIG. 7.

FIG. 9 is a top plan view of a container forming part of the assembly of FIGS. 7, 8.

Figure 6:
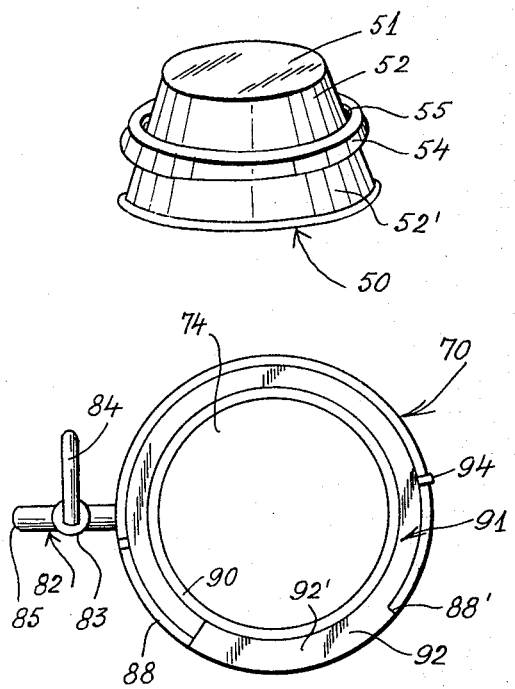
FIG. 6 is a perspective view of the suction cup per se.

Referring first to FIGS. 1–4, there is shown a beverage container or cup 10 having a generally cylindrical side wall or body 12 with a closed circular bottom 14. Top and bottom edges 16, 18 of the cylindrical body 12 are beaded to strengthen the structure and to present smooth rounded edges thereat. Integral with the bottom 14 is a frustoconical foot 20 which extends axially downward and serves as a stand for the cup. Foot 20 has a smooth, rounded outer beaded edge 21 extending circumferentially of the foot. The cup can be made of metal, plastic or plastic coated paper. Foot 20 can be fabricated separately and attached to the bottom 14 by a suitable cement, by welding or other means. Alternatively the foot 20 can be integrally molded with the bottom 14.

Attached to a side of body 12 is a short tubular member 22 which extends in the axial direction of the cup. Rotatably disposed in this tubular member is an axially vertical hinge rod 24. Opposite ends of the rod are secured in tubular eyes 26, 28 at opposite ends of a generally U-shaped flat handle 30. The handle is rotatable with rod 24 and always remains in a vertical plane.

The upper end of eye 26 and the lower end of eye 28 abut adjacent beaded edges 16 and 18 of the body 12. This arrangement prevents axial movement of the rod and vertical movement of the handle with respect to body 12.

Near the upper corner of the handle is a pin, eyelet or rivet 32. Pivotally engaged by this rivet is a small flat generally rectangular plate 34. Plate 34 abuts one side of handle 30. On the upper edge of plate 34 is a recess 35 in which is set a leaf spring 36 secured by pins or rivets 38. Spring 36 has a hooked end 40 which engages over the upper beaded edge of the cup as best shown in FIGS. 1, 2 and 3. By this arrangement the flat handle is held in a vertical plane radial to the body 12 and extending outwardly thereof.

Figure 4:
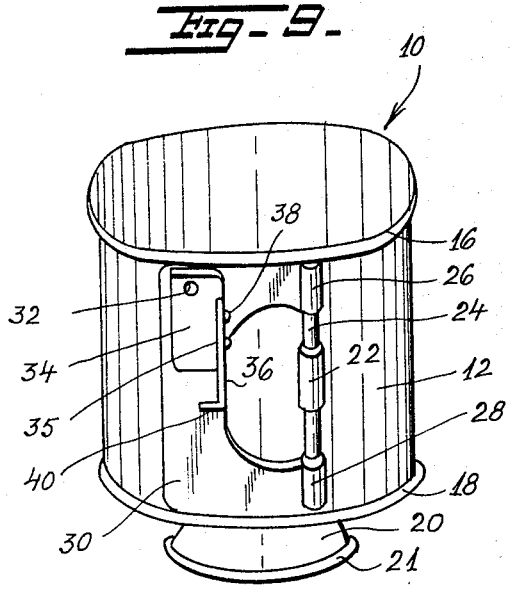
FIG. 4 is a perspective view of the cup with hinged handle shown in retracted position.

The plate 34 and spring 36 together constitute a catch assembly which can be rotated outwardly or clockwise as indicated by arrows A in FIGS. 1 and 3. This will disengage the hook 40 from the cup body and the released handle can then be toward the body 12 as indicated by arrow B in FIG. 3. FIG. 4 shows the hinged handle 30 assuming a position tangential to body 12. There it is retracted and out of the way. This arrangement of the handle facilitates packing, shipping and storage of the cup since then it occupies a minimum of space.

FIGS. 5 and 6 show a frustoconical suction cup 50 used as an accessory to cup 10 which is otherwise the same as shown in FIGS. 1–4. Cup 50 has a flat circular top 51 and outwardly flaring side wall or skirt 52. Integral with the resilient cup 50 is a channel 54 which extends circumferentially of side wall 52. The channel 54 is open upwardly and has an undercut circumferential recess 55 at its inner side which engages bead 21 at the bottom edge of the conical foot 20. The channel 54 snaps over this bead 21 when the suction cup is inserted into the foot as clearly shown in FIG. 5. The suction cup will hold the cup in a set position on a smooth or slippery surface. It will be noted that the lower wider section 52' of the suction cup extends axially outwardly beyond the foot 20 for supporting the cup 10.

Figure 7:
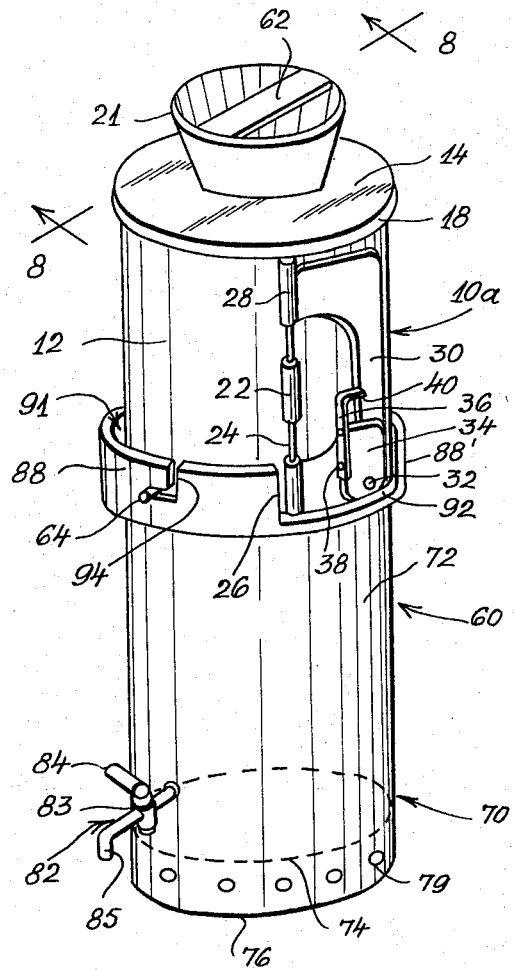
FIG. 7 is a perspective view of a container assembly including a cup with hinged handle.

FIGS. 7 and 8 show a container assembly 60 of which cup 10A forms a part. Cup 10A is similar to cup 10 and corresponding parts are identically numbered. In cup 10A which is shown in an inverted position in FIGS. 7 and 8, a flat handle bar 62 is shown secured at opposite ends in foot 20 coplanar with the outer free beaded edge 21. The bar serves as a handle which can be grasped for carrying the cup 10A or assembly 60. In diametrically opposite positions on the cup body 12 near bead 16 are two pins 64. These pins extend radially outwardly of the cup body. The cup 10A is shown mounted on a beverage container 70 of a type somewhat similar to those described in my prior patents 3,273,739 and 3,281,006.

Container 70 has a cylindrical side wall or body 72 with a closed circular bottom 74 defining a chamber 75 for receiving any desired beverage. The bottom 74 is spaced from the lower edge 76 of side wall 72 to define a chamber 77 in which can be disposed a suitable heater 80. This heater can be a can of combustible solid fuel. Holes 79 in wall 72 admit air to chamber 77. At the bottom of chamber 75 is a dispensing tube or faucet 82. The faucet extends radially outwardly of wall 72 and is provided with a valve 83 opened and closed by turning handle 84. The faucet has a dispensing nozzle 85. The container 70 can be disposed on a suitable supporting surface S as shown in FIG. 8 and the contents of the container can be heated. The cup 10A then serves as a cover to accelerate heating of the contents of the container.

The container 70 is provided with two cylindrical flanges 88, 90 concentrically arranged radially spaced apart and axially aligned with wall 72. A narrow, horizontal radially extending annular wall 92 is secured centrally to the upper edge of side wall 72 and supports the flanges 88, 90. Between the flanges is defined a trough or channel 91 which receives in sealing relationship beaded edge 16 of cup 10A which is now in inverted position as shown in FIGS. 7 and 8. A portion of flange 88 is cut away leaving a cutout 88' which clears the retracted handle 30 of cup 10A. In all positions of the handle a pair of L-shaped bayonet slots 94 is provided in diametrically spaced apart locations on flange 88 to receive and engage pins 64. By this arrangement the cup 10A and container 70 can be easily and detachably engaged together. The cup 10A can be easily removed from the container, inverted and used to receive a beverage dispensed via faucet 82. The handle 30 will be extended and engaged on beaded edge 16 in the manner shown in FIG. 1 when the cup is used to receive liquid dispensed from container 70.

The conical foot 20 serves as a protective stand when the cup contains a hot beverage. The handle bar 62 can be used for carrying the entire assembly 60 when cup 10A is in the inverted position shown in FIG. 7. If desired handle plate 30 can be used as a handle to carry assembly 60 even though the catch means is not hooked over the beaded edge 16 of the cup.

Cups 10 and 10A are thus very versatile in the ways in which they can be used. They can be manufactured at relatively low cost.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A container assembly for hot beverages, comprising a cup-shaped body having a cylindrical side wall and integral circular bottom wall at one end, the other end of said body being open, a foot integral with said bottom wall for elevating said body above a supporting surface, and a handle assembly hinged to said side wall, said handle assembly comprising a fixed hinge member secured to said side wall, a hinge rod extending rotatably through said hinge member, a flat U-shaped handle plate having tubular eyes at opposite ends, said tubular eyes being secured to opposite ends of said rod so that the flat plate rotates with the rod in said hinge member, and catch means on said plate for engaging said other end of said body for holding the handle plate in a first position extending radially outward of said body in a diametral plane thereof, whereby the handle plate can be turned to another position tangential to the side wall of said body when said catch means is released.

2. A container assembly as recited in claim 1, wherein opposite ends of said cylindrical side wall is formed with circumferential beaded edges, outer ends of said tubular eyes contacting said beaded edges so that the rod and handle plate are prevented from moving in a direction axially of said body.

3. A container assembly as recited in claim 1, wherein said catch means comprises a small other plate pivotally secured near one corner of the handle plate, a leaf spring secured to said other plate and having a hooked end engageable on said other end of said body to hold the handle plate in said first position.

4. A container assembly as recited in claim 3, wherein opposite ends of said cylindrical side wall is formed with circumferential beaded edges, outer ends of said tubular eyes contacting said beaded edges so that the rod and handle plate are prevented from moving in a direction axially of said body.

5. A container assembly as recited in claim 1, wherein said foot is frustoconical in form for stabilizing said body when supported on said surface, said foot having an outer beaded edge for engaging a suction cup.

6. A container assembly as recited in claim 4, wherein said foot is frustoconical in form for stabilizing said body when supported on said surface, said foot having an outer circumferential beaded edge, and a resilient frustoconical suction cup removably inserted in said foot and having a supporting section extending outwardly beyond said foot, said suction cup having a circumferential undercut channel detachably engaged with the beaded edge of said foot.

7. A container assembly as recited in claim 1, further comprising a beverage container having a cylindrical body wall with another circular bottom wall near one end of said body all defining therewith a chamber for containing said beverage, said body wall having an open other end, a pair of concentric radially spaced flanges secured by an annular radially extending wall to said other end of said body wall and defining a circumferentially extending channel, said cup-shaped body being disposed in an inverted position with the other end of its side wall in said channel in sealing relationship with said annular wall.

8. A container assembly as recited in claim 7, further comprising mutually engageable and disengageable fastener means on the cylindrical side wall of the cup-shaped body and on the body wall of the container for holding the cup-shaped body and container in axial alignment with said cup-shaped body covering and closing said chamber.

9. A container assembly as recited in claim 8, wherein said fastener means includes pins on the cup-shaped body and bayonet slots on the body wall of the container engageably by said pins.

10. A container assembly as recited in claim 9, wherein the outer one of said flanges has a cut-out so that the handle plate in all positions thereof on the cup-shaped body clears said outer flange, whereby the handle plate can serve as a carrying handle for both the cup-shaped body and the container, and a handle bar secured to said foot to serve as a fixed alternate handle for carrying the cup-shaped body when detached from the container and for carrying the cup-shaped body and container when they are attached together.

References Cited

UNITED STATES PATENTS

| | | | |
|---|---|---|---|
| 636,988 | 11/1899 | Herburger | 206—4 |
| 2,555,788 | 6/1951 | Donaldson | 206—4 |
| 3,273,739 | 9/1966 | Wei | 220—4 |

FOREIGN PATENTS

| | | |
|---|---|---|
| 539,204 | 6/1922 | France. |
| 60,461 | 12/1942 | Denmark. |

THERON E. CONDON, *Primary Examiner.*

G. E. LOWRANCE, *Assistant Examiner.*